United States Patent Office 2,702,825
Patented Feb. 22, 1955

2,702,825

ALKYL POLYCHLOROBENZYL ETHERS

Sidney D. Ross, Williamstown, and Moushy Markarian, North Adams, Mass., assignors to Sprague Electric Company, North Adams, Mass., a corporation of Massachusetts No Drawing. Application August 7, 1951, Serial No. 240,800

5 Claims. (Cl. 260—611)

This invention relates to a new group of halogenated ethers. More particularly it refers to certain dialkyl ethers in which one of the alkyl groups is substituted with a halogenated aromatic nucleus. This application is a continuation in part of our copending application, Serial No. 12,138, filed February 28, 1948, now U. S. Patent No. 2,564,214 granted August 14, 1951.

It is an object of this invention to produce new and useful compounds possessing high boiling points and unusual chemical stability. A further object is to produce valuable polar dielectric compositions. Another object is to provide new and useful, flame-resistant, pentachlorobenzyl alkyl ethers. Additional objects will become apparent from a consideration of the following description and claims.

The compounds of our invention conform to the general formula:

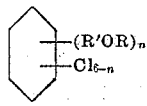

in which R' represents a bivalent, saturated, aliphatic hydrocarbon radical, R represents a monovalent, saturated, aliphatic, hydrocarbon radical, and $n$ represents an integer from 1 to 2.

In a more limited sense the invention is concerned with compounds conforming to the general formula:

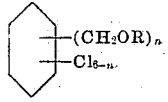

in which R and $n$ have the same significance as above.

Still more specifically the invention pertains to compounds conforming to the general formula:

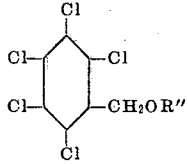

in which R" represents an alkyl group.

The preferred compounds of the invention, which conform to the last formula given above, are pentachlorobenzyl alkyl ethers. Among the preferred alkyl ethers of this type are:

Pentachlorobenzyl methyl ether
Pentachlorobenzyl ethyl ether
Pentachlorobenzyl n-propyl ether
Pentachlorobenzyl isopropyl ether
Pentachlorobenzyl butyl ether
Pentachlorobenzyl amyl ether Other compounds of the invention, which conform to the first general formula when the integer $n$ is 2, are also of particular interest. Among the preferred compounds of this series are:

1,2-bis(propoxymethyl)-3,4,5,6-tetrachlorobenzene
1,4-bis(propoxymethyl)-2,3,5,6-tetrachlorobenzene Still further compounds of the invention, which conform to the first general formula, when R' represents a bivalent, saturated, aliphatic hydrocarbon radical containing more than one carbon atom, are of considerable interest. Among such compounds there may be mentioned the following:

1-pentachlorophenyl-2-ethoxy ethane
1-pentachlorophenyl-3-methoxy propane
1-pentachlorophenyl-4-ethoxy butane
1-pentachlorophenyl-2-propoxy ethane
1,4-bis(betapropoxyethyl)-2,3,5,6,-tetrachlorobenzene Our new compounds may readily be prepared by reacting a halogenoalkyl polychlorobenzene with an alkali metal alkoxide of an alcohol. Alternatively, they may be prepared by reacting a hydroxyalkyl polychlorobenzene with an aliphatic halide. The polychlorobenzenes used will contain either one or two halogenoalkyl or hydroxyalkyl groups attached to the benzene nucleus, the remaining hydrogens on the ring being substituted by chlorine. The halogenoalkyl groups preferably contain a single chlorine or bromine substituent which combines with the alkali-metal of the alcoholate in the first mentioned process.

The alcohol and aliphatic halides employed in the foregoing processes are preferably monovalent and saturated. Suitable alcohols for use in the first mentioned process include the methyl-, propyl-, 2-butenyl-, amyl-, pentenyl-, benzyl-, etc. alcohols. Aliphatic halides that may be employed in the second process include the ethyl-, propenyl-, butyl-, etc. chlorides and bromides.

In the following examples, given for purposes of illustration, the first mentioned process is used. Obviously, in most cases the second process could be substituted with substantially equivalent results.

EXAMPLE I

*Preparation of pentachlorobenzylchloride*

1065 gms. of pentachlorotoluene were heated to its melting point, and chlorine was introduced, until the gain in weight was 137 gms. The crude reaction mixture was poured while hot into a distilling flask and fractionated at 0.27 mm. to yield a forerun, B. P. 120–132° C., weighing 70 gms. and the main fraction, B. P. 134–136° C., weighing 1063 gms. This main fraction melted at 72–95° C. Crystallization from a 50–50 benzene-alcohol mixture gave 796 gms. melting at 99–102° C., representing a 66.5% yield of pentachlorobenzylchloride.

EXAMPLE II

*Preparation of pentachlorobenzyl methyl ether*

A mixture of 14.9 gms. of pentachlorobenzylchloride, produced as described in Example I, 10 gms. of sodium hydroxide and 100 cc. of methanol was refluxed for ten hours and then poured into water. The crude product was filtered and dried. It weighed 14 gms. and melted at 97–110° C. Crystallization from ethyl alcohol gave 9.5 gms., melting at 100–102° C. A sample crystallized for analysis two additional times from ethyl alcohol and once from acetone melted at 107.5–108.5° C.

Calculated for $C_8H_5OCl_5$: C=32.60%, H=1.70%.
Found by analysis: C=32.30 and 32.12%, H=1.49 and 1.70%.

EXAMPLE III

*Preparation of pentachlorobenzyl ethyl ether*

A mixture of 14.9 gms. pentachlorobenzylchloride, produced as described in Example I, 10 gms. of sodium hydroxide and 100 cc. ethanol was refluxed for two hours and water was then added. On cooling a solid precipitated. This was filtered and crystallized from 95% ethanol to yield 12 gms. of the ether melting at 62–65° C. A sample crystallized for analysis four times from 95% ethanol melted at 65–66° C.

Calculated for $C_9H_7OCl_5$: C=35.10%, H=2.29%.
Found by analysis: C=35.40 and 35.18%, H=2.12 and 1.98%.

EXAMPLE IV

*Preparation of pentachlorobenzyl propyl ether*

Sodium propoxide was prepared by adding 4.14 gms. sodium to 225 cc. n-propanol. 44.8 gms. pentachlorobenzylchloride, produced as described in Example I, were added, and the mixture was refluxed for four hours and then poured into water. The organic material was extracted with chloroform. The chloroform extract was dried and distilled to yield 34 gms. (70%) of the desired ether, boiling at 131° C. at 0.4 mm. On standing, the ether crystallized, melting at 34–37° C. A sample crystallized for analysis four times from 95% ethanol melted at 43–44° C.

Calculated for $C_{10}H_9OCl_5$: C=37.24%, H=2.80%. Found by analysis: C=37.72 and 37.96%, H=3.01 and 2.78%.

EXAMPLE V

*Preparation of pentachlorophenyl-n-butyl ether*

Sodium-n-butoxide was prepared by adding 13.8 gms. of sodium to 750 cc. n-butanol. 149.4 gms. of pentachlorobenzylchloride, prepared as described in Example I, were added, and the mixture was refluxed for twelve hours. Water was then added. The butanol layer was separated, washed with saturated sodium chloride solution, dried over magnesium sulfate, filtered and distilled yielding 112 gms. of the ether, boiling at 138–139° C. at 0.4 mm. A small sample redistilled for analysis had a B. P. of 138–139.5° C. at 0.3 mm. and an index of refraction ($n_D^{20°c.}$) of 1.5612. The ether is liquid at room temperature.

EXAMPLE VI

*Preparation of 1,2-bis (bromomethyl)-3,4,5,6-tetrachlorobenzene*

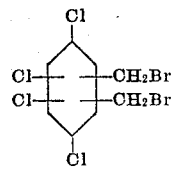

244 gms. of tetrachloro-ortho-xylene were dissolved in 750 cc. of carbon tetrachloride in a two liter flask equipped with a stirrer, reflux condenser and a dropping funnel, the flask being illuminated with an ultra-violet light. 320 gms. of bromine were added dropwise, until the bromine color disappeared. The solvent was evaporated off, leaving a crystalline residue. This was recrystallized from an acetone-carbon tetrachloride mixture. The first crop amounted to 290 gms., M. P. 114–117° C. Three other crops yielded a total of 92 gms. with slightly lower melting points.

EXAMPLE VII

*Preparation of 1,2-bis (n-propoxymethyl)-3,4,5,6-tetrachlorobenzene*

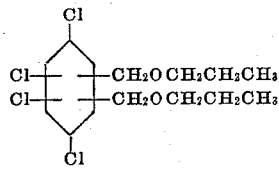

201 gms. of the 1,2-bis(bromomethyl)-3,4,5,6-tetrachlorobenzene, produced as described in Example VI, were added to a solution of sodium n-propoxide made from 27.6 gms. of sodium and 750 cc. of n-propanol. The mixture was refluxed over night, water added and the organic layer separated and washed with saturated sodium chloride. The organic layer was then dried with magnesium sulfate and filtered. The excess propanol was distilled off at atmospheric pressure and the organic residue fractionated at reduced pressure. A 157 gm. fraction boiling at 148–155° C. at 0.25–0.6 mm. was the product.

Following the procedures outlined above, particularly that given in Example III, it has been possible to produce ethers wherein the bivalent, saturated aliphatic hydrocarbon radical R', appearing in the first general formula hereinbefore given, is —CH(CH₃)— and —CH₂—CH₂—. Alpha-bromoethyl pentachlorobenzene may be refluxed with KOH and ethanol to give 1-pentachlorophenyl-1-ethoxy-ethane, M. P. 88–89° C. (Calculated for $C_{10}H_9Cl_5O$: H=2.80, found H=2.72%.) Beta-chloroethyl pentachlorobenzene may be refluxed with KOH and ethanol to give 1-pentachlorophenyl-2-ethoxy-ethane, M. P. 86–88° C. In each of these reactions, a large amount of pentachlorostyrene was obtained by dehydrohalogenation of the side chain.

The compounds of the invention are of utility in a wide variety of fields. Perhaps because chlorine and hydrogen atoms are not located on the same or adjacent carbon atoms, our new materials exhibit unusual chemical and electrical stability. The stability is particularly pronounced, when compared with chlorinated diphenyl oxide and other, known, halogenated aryl ethers.

Our new compounds are particularly desirable for electrical applications. They possess relatively high dielectric constants, due to their molecular structure. The boiling points are high, and the resistance to flammation is exceptional. The butyl ether described in Example V, and the bis-propoxymethyl compound described in Example VII are both liquid at room temperature, and are especially suitable as liquid dielectric impregnants for electrical capacitors. The butyl ether possesses a dielectric constant in excess of 5 at 60 cycles A. C.

The high chlorine content of the compounds results in their applicability where resistance to flame is a determining factor. The compounds and mixtures thereof are useful as heat-transfer mediums, as modifiers for increasing the flash point of oils, finishes and the like, as transformer fluids and, for certain applications, as lubricating mediums.

The polar nature and other features of the compounds described herein permit their use as plasticizers for resinous materials. The polyvinylhalides in particular, may be modified by incorporation therewith of the halo ethers of the invention. The chlorine content of these ethers results in satisfactory compatibility, and the flame resistance of the resin may be increased by such modification.

It is contemplated that the monovalent, aliphatic hydrocarbon radical R in the first two general formulae may be further substituted for special applications, for example, where electrical stability is not an important factor.

As many widely different embodiments of this invention may be made without departing from the spirit and scope hereof, it is to be understood that the invention is not limited to the specific embodiments hereof except as defined in the appended claims.

What we claim is:

1. A compound conforming to the formula:

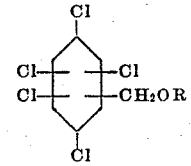

wherein R represents an alkyl group.
2. Pentachlorobenzyl methyl ether.
3. Pentachlorobenzyl ethyl ether.
4. Pentachlorobenzyl propyl ether.
5. Pentachlorobenzyl butyl ether.

References Cited in the file of this patent

UNITED STATES PATENTS

| | | |
|---|---|---|
| 2,139,369 | Kyrides | Dec. 6, 1937 |
| 2,412,389 | Cass | Dec. 10, 1946 |

OTHER REFERENCES

Wislicenus et al., "Berichte der Deut. Chem. Ges.," vol. 43 (1910), page 1837.

Weinman et al., Jour. Econ. Entomol., vol. 40 (1947), pages 74–78 (5 pages).